US008797470B2

(12) United States Patent
Pelfrey

(10) Patent No.: US 8,797,470 B2

(45) Date of Patent: Aug. 5, 2014

(54) SYSTEM FOR SELECTIVELY REVEALING INDICIA

(75) Inventor: Keith Allen Pelfrey, Wadsworth, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 13/549,667

(22) Filed: Jul. 16, 2012

(65) Prior Publication Data

US 2012/0279983 A1 Nov. 8, 2012

Related U.S. Application Data

(62) Division of application No. 12/283,672, filed on Sep. 15, 2008, now Pat. No. 8,243,217.

(51) Int. Cl.
*G02F 1/1335* (2006.01)

(52) U.S. Cl.
USPC .............................................. 349/16; 463/31

(58) Field of Classification Search
USPC ........................................ 349/16; 463/29–31
See application file for complete search history.

(56) References Cited

U.S. PATENT DOCUMENTS 7,309,284 B2 * 12/2007 Griswold et al. ............... 463/29
2004/0127277 A1 * 7/2004 Walker et al. ................... 463/16
2004/0171423 A1 * 9/2004 Silva et al. ...................... 463/31
2008/0227526 A1 * 9/2008 Crossman et al. .............. 463/20

* cited by examiner

*Primary Examiner* — Edward Glick
*Assistant Examiner* — David Chung
(74) *Attorney, Agent, or Firm* — Renner, Kenner, Greive, Bobak, Taylor & Weber

(57) ABSTRACT

A system for selectively revealing indicia to an observer comprises a transitioning window having a receiving surface and a viewing surface. The receiving surface is positioned in optical communication with an indicia holder that is configured to removably retain indicia, such as information content. During operation, the transitioning window transitions from a substantially opaque state to a substantially transparent state so as to reveal or otherwise display the indicia to an observer via the viewing surface.

10 Claims, 6 Drawing Sheets

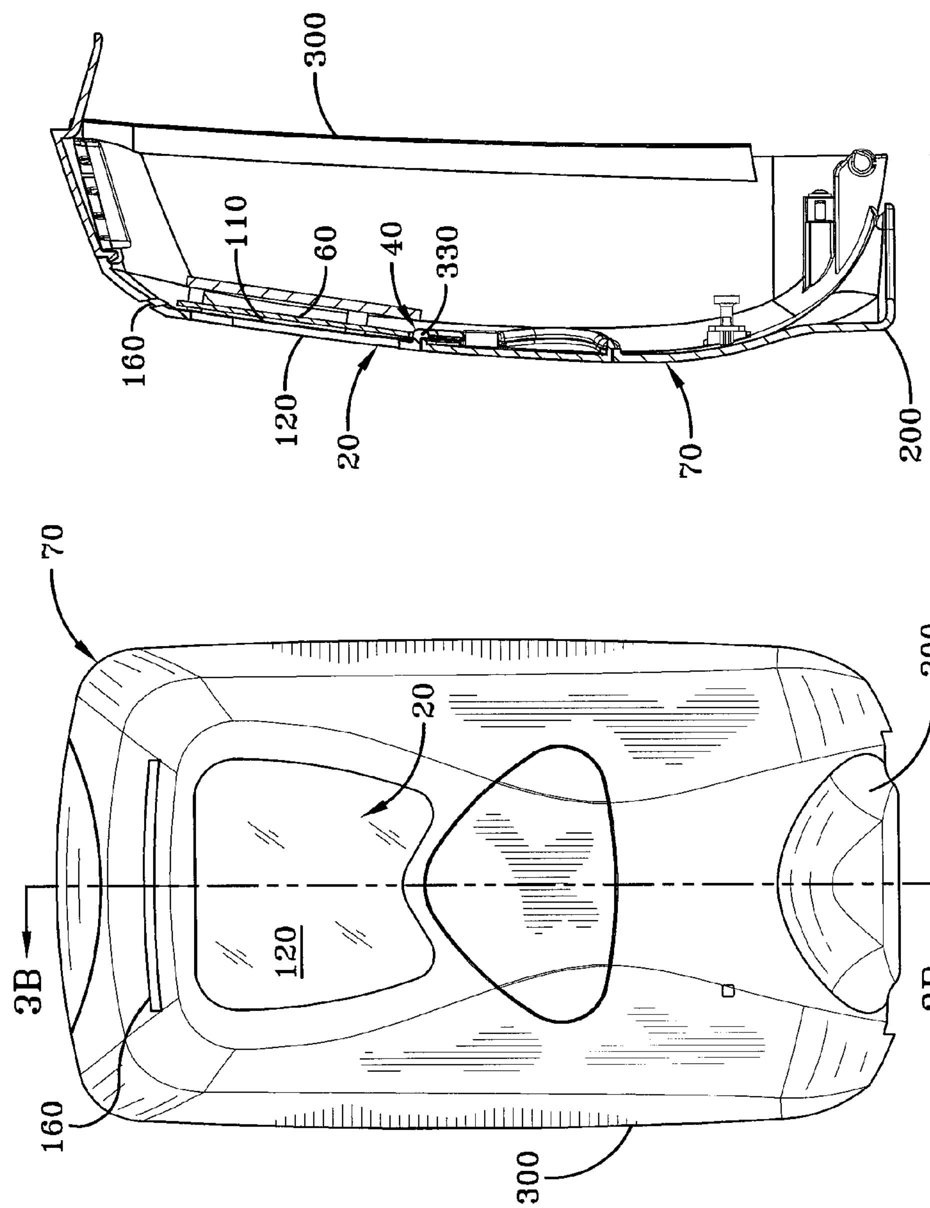
FIG—3B
FIG—3A

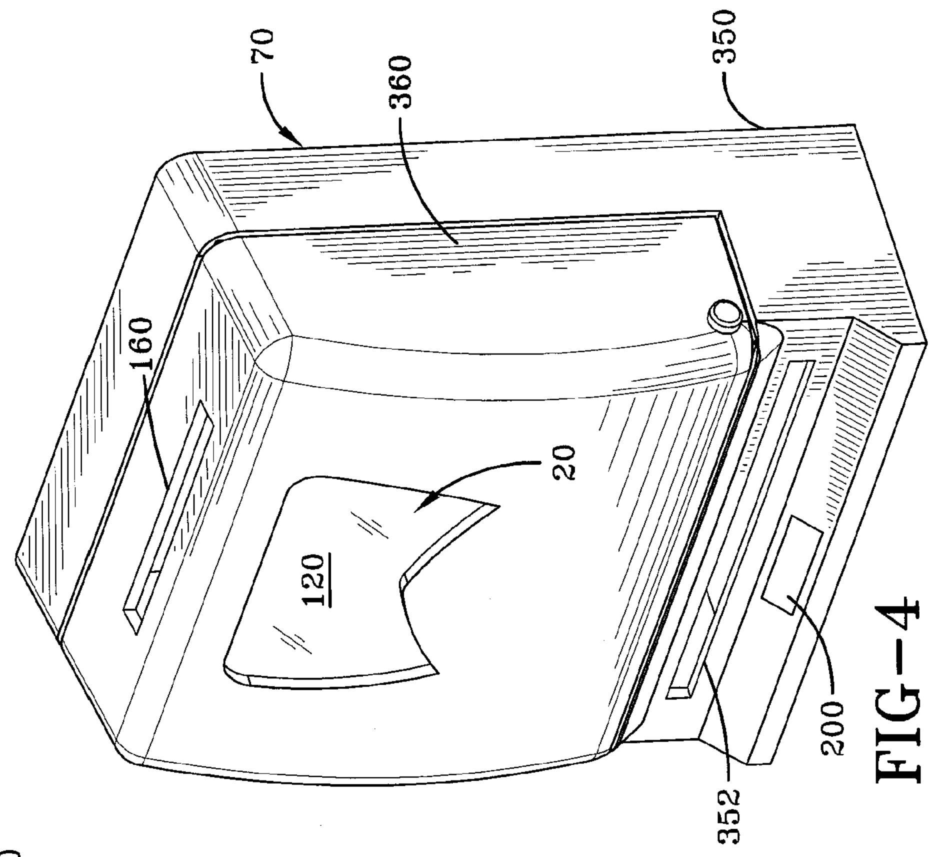
FIG—4
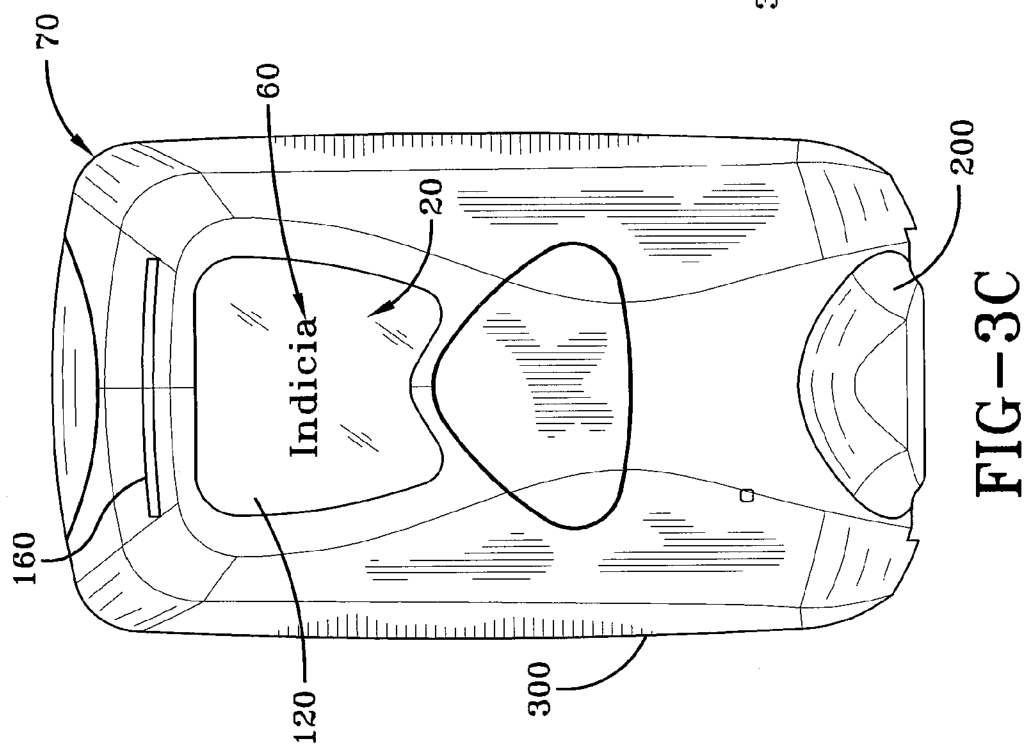
FIG—3C

SYSTEM FOR SELECTIVELY REVEALING INDICIA

CROSS-REFERENCE TO RELATED APPLICATION

This application is a divisional application of U.S. patent application Ser. No. 12/283,672 filed on Sep. 15, 2008, now U.S. Pat. No. 8,243,217 the contents of which are incorporated herein by reference.

TECHNICAL FIELD

Generally, the present invention relates to a system to selectively reveal removable indicia. In particular, the present invention is directed to a transitioning liquid crystal (LC) window to selectively reveal removable indicia. More particularly, the present invention is directed to a transitioning liquid crystal (LC) window that is configured to selectively reveal removable indicia in association with a dispenser, appliance, or other device.

BACKGROUND ART

Advertisements, displays, and other informational signage or content have achieved a level of ubiquity in our environment that over time, the population has become very adept at blocking out or otherwise ignoring the information or message conveyed therefrom. To overcome this obstacle in an effort to attract an individual's attention, advertisement campaigns are painstakingly designed and employ a variety of techniques to present information in a compelling manner and to appeal to the interests and senses of the target individual. Thus, to a large degree, the success of a particular advertising or marketing effort to communicate its message to potential consumers is heavily reliant on the medium chosen. However, the cost and expense of developing and producing a marketing campaign with the requisite appeal needed to gain a consumer's interest is significant. Additionally, an advertising campaign that utilizes moving, dynamic images or content to attract the attention of a target individual is costly, as it requires a significant amount of production effort to implement such a concept.

In addition to the cost of producing dynamic informational content, the cost of display units, such as flat screen displays upon which the content is presented, as well as the costs associated with operating such displays, are also significant expenses, thus restricting the total number of locations where such displays will ultimately be installed. In addition, continuously updating the dynamic content presented on such displays is costly and time consuming as well. As such, there are significant costs associated with installing and maintaining a display capable of rendering dynamic informational content. In contrast, informational content that is static or fixed, such as printed content embodied in posters, billboards, and magazines, is much less costly to produce than that of dynamic content but is generally less effective in attracting the interest and attention of a target individual.

Therefore, there is a need for a low-cost, low-power system for selectively revealing indicia, such as a static printed image via a transitioning window, which transitions between substantially opaque and substantially transparent states to capture an individual's attention. Additionally, there is a need for a system for selectively revealing indicia that utilizes a transitioning window in connection with indicia that can be removably replaced as desired. Furthermore, there is a need for a system for selectively revealing indicia that utilizes a transitioning window in connection with a dispenser or any other suitable structure.

SUMMARY OF INVENTION

In light of the foregoing, it is a first aspect of the present invention to provide a system for selectively revealing indicia.

It is another aspect of the present invention to provide a system for selectively revealing indicia to an observer comprising a transitioning window having a receiving surface and a viewing surface, said window configured to transition between an at least partially transparent state and an at least partially opaque state, a controller coupled to said transitioning window, an actuator coupled to said controller, and an indicia holder configured to removably retain the indicia in optical communication with said receiving surface, wherein upon the actuation of said actuator, said transitioning window transitions from said at least partially opaque state to said at least partially transparent state, so as to permit the observer to view the indicia via said viewing surface.

Still another aspect of the present invention is to provide a method for selectively revealing indicia to an observer comprising the steps of providing a transitioning window having a receiving surface and a viewing surface, said transitioning window having an at least partially opaque state and an at least partially transparent state, providing indicia in optical communication with said receiving surface, and actuating said window to transition from said at least partially opaque state to said at least partially transparent state to reveal said indicia via said viewing surface.

BRIEF DESCRIPTION OF THE DRAWINGS

These and other features and advantages of the present invention will become better understood with regard to the following description, appended claims, and accompanying drawings wherein:

FIG. 3A is a front elevational view of the system for selectively revealing indicia embodied as a fluid dispenser, whereby the transitioning window is substantially opaque, so as to obscure the indicia disposed therebehind in accordance with the concepts of the present invention;

FIG. 3B is a side elevational view of the system for selectively revealing indicia shown in FIG. 3A in accordance with the concepts of the present invention;

FIG. 3C is a front elevational view of the system for selectively revealing indicia embodied as a fluid dispenser, whereby the transitioning window is substantially transparent, so as to permit the display of the indicia therethrough in accordance with the concepts of the present invention;

FIG. 4 is a perspective view of the system for selectively revealing indicia when embodied as a towel dispenser in accordance with the concepts of the present invention;

BEST MODE FOR CARRYING OUT THE INVENTION

Figure 1:
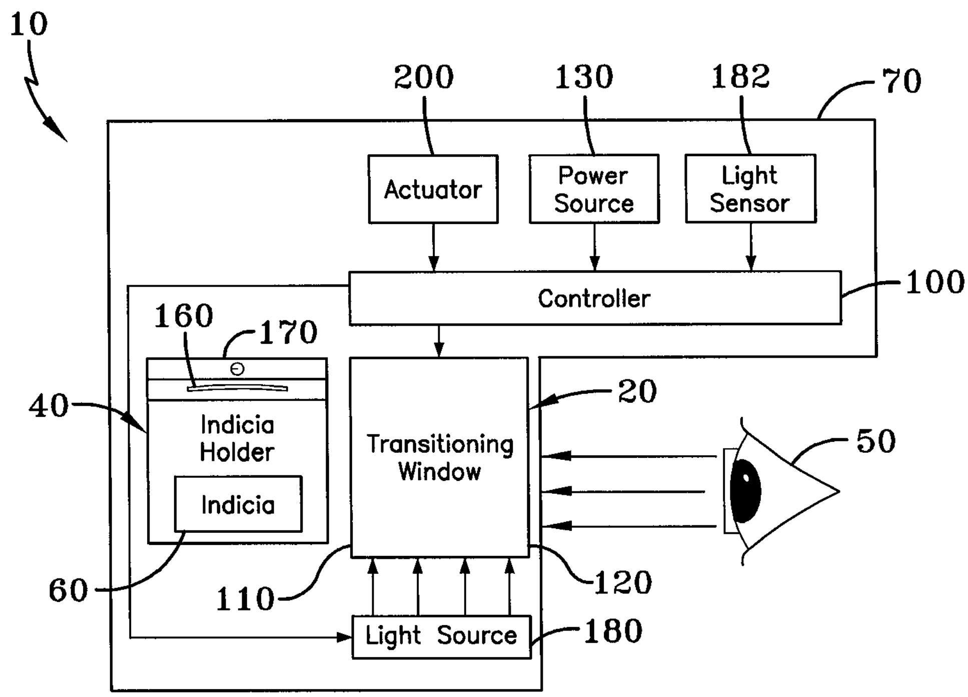
FIG. 1 is a block diagram of a system for selectively revealing indicia in accordance with the concepts of the present invention.
Figure 2:
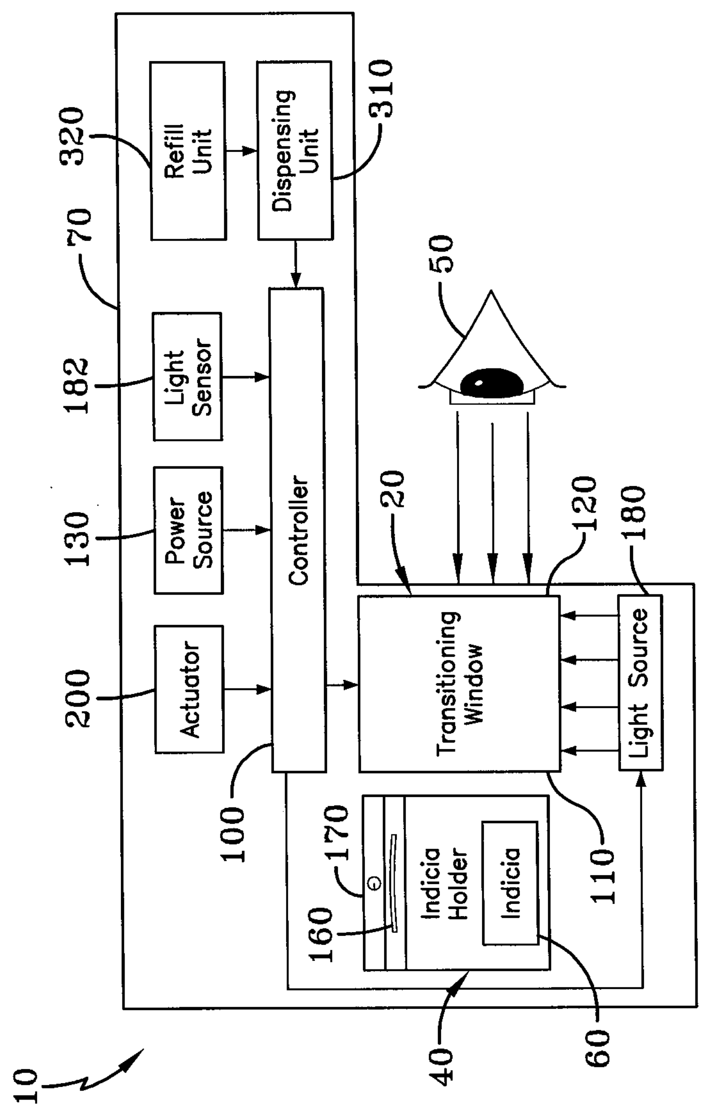
FIG. 2 is a block diagram of the system for selectively revealing indicia when configured for use with a dispenser in accordance with the concepts of the present invention.

A system for selectively revealing indicia is generally referred to by the numeral 10, as shown in FIGS. 1-2. In particular, the system 10 includes a transitioning window 20, such as a polymer dispersed liquid crystal window, which is configured to selectively transition from a substantially, or at least partially, opaque state to a substantially, or at least partially, transparent state. Thus, the use of the terms "opaque state" and "transparent state" as used in the following discussion contemplate opaque and transparent states that are substantially or at least partially opaque and substantially or at least partially transparent. Continuing, the transitioning window 20 is maintained by the system 10 so that it separates an indicia holder 40 from the line of sight or field of view of an observer 50. As such, the indicia holder 40 is configured to removably retain indicia 60, such as a printed advertisement or other informational content. For the purposes of the following discussion, the term "indicia" is defined as any information, communication, advertisement, image, message, or the like. For example, the indicia 60 may comprise printed characters on a section of paper. Thus, during operation of the system 10, the observer 50 is permitted to view the indicia 60 when the window 20 transitions from the opaque state to the transparent state. The transition between opaque and transparent states may be controlled in accordance with various criteria, such as the input from various stimuli, including the actuation of a switch or via a proximity detector that is configured to detect the presence of a person or the person's hands. As such, the system 10 allows the message or informational content to be conveyed by the indicia 60 in a manner that captures the attention of the observer 50, thus enhancing the effect of informational content provided by the indicia 60. Furthermore, the indicia holder 40 permits a user to quickly and readily change the indicia 60, thereby allowing the informational content conveyed thereby to be updated in a quick and simple manner. While it is understood that a continuum exists between the substantially transparent state, the partially transparent state, the partially opaque state, and the substantially opaque state provided by the transitioning window 20, it should be appreciated that in general the observer 50 will more clearly view the indicia 60 when the transitioning window 20 is in a transparent state, than when the transitioning window is in an opaque state.

Specifically, the system 10 is carried or otherwise disposed within a housing 70 that may be configured to be integral with or otherwise associated with any desired structure, including, but not limited to, a dispenser, a fixture, or an appliance. For example, the housing 70 may be formed so as to be integral with a soap dispenser, a towel dispenser, a spray mister, a toilet, or a urinal. Alternatively, it should be appreciated that the housing 70 may be formed as a standalone device that may be mounted in any desired location. Continuing, the housing 70 maintains a controller 100 that comprises any suitable general-purpose or application-specific computing device suitable for carrying out the functions to be discussed. In one aspect, the controller 100 may maintain non-volatile memory, volatile memory, or a combination of both to facilitate the operation of the system 10. Furthermore, it should be appreciated that the housing 70 may be formed of any suitable material, such as plastic, steel, or aluminum for example, and may be of any suitable size or shape.

Electrically coupled to the controller 100 is the transitioning window 20, which is configured to selectively transition from a substantially transparent state to a substantially opaque state and vice versa. The transitioning window 20 maintains a receiving surface 110 opposite a viewing surface 120, and although the transitioning window 20 may be configured such that the surfaces 110 and 120 oppose each other, other configurations are also contemplated, whereby the surfaces 110 and 120 may be oriented in any desired angle or position with regard to one another. Moreover, the opposed surfaces 110 and 120 may be dimensioned to take on any desired shape, size, or contour. The transitioning window 20 comprises a window formed of polymer dispersed liquid crystals (PDLC) or may be comprised as a suspended particle device (SPD). However, it is also contemplated that the transitioning window 20 may comprise an electrochromic device, as well as any other device which may be controlled so as to transition from an opaque or substantially opaque state to a transparent or substantially transparent state.

Coupled to the controller 100 is a power source 130 that is configured to power the components of the system 10. The power source 130 may comprise a portable D.C. (direct current) power source such as a battery, or may be configured to receive and convert power from an A.C. (alternating current) mains power source, such as 120 VAC (alternating current), into a format compatible for operating the system 10. It is also contemplated that the power source 130 may comprise a solar or photovoltaic power source or any other source of power. It should also be appreciated that the power source 130 may comprise a combination of portable power and solar and/or mains power or any other suitable power source. In addition, the power source 130 may solely power the system 10 or in other embodiments may power both the system 10, as well as other aspects of the structure that the system 10 is integrated with. For example, the system 10 may be made integral with a hands-free dispenser configured to dispense a fluid, which are both powered by the power source 130. Furthermore, due to the reduced power requirements of the transitioning window 20, extended operation of the system 10 is permitted when batteries or other portable power source is used.

Maintained adjacent to the receiving surface 110 is the indicia holder 40 that is configured to removably retain indicia 60 in optical alignment with the transitioning window 20, so that it can be selectively revealed to the observer 50 via the viewing surface 120 when the transitioning window 20 is in a transparent or substantially transparent state. While the indicia holder 40 is discussed as being adjacent the receiving surface 110, it should be appreciated that the indicia holder 40 may be oriented in any desired position with respect to the receiving surface 110 so long as it is in optical communication therewith. For example, the indicia holder 40 may be remotely located from the receiving surface 110, while the image from the indicia 60 is routed to the receiving surface 110 via mirrors or any suitable means.

Continuing, the indicia holder 40 may comprise any suitable device capable of holding, supporting, carrying or otherwise maintaining the indicia 60 in place, while in other embodiments, still permitting the indicia 60 to be removed and replaced. As such, the indicia holder 40 allows the user maintaining the system 10 to readily customize and/or update the content provided by the indicia 60. However, in certain embodiments it is foreseen that the indicia 60 may be permanently mounted or placed in the indicia holder 40.

In one aspect, the system 10 may be configured with an access port 160 within the housing 70, such as a slot for example, that allows an individual to directly access the indicia 60 to thereby remove or replace it as desired. It is also contemplated that access to the indicia holder 40, via the access port 160, may be restricted to only authorized individuals via a locking device 170. The locking device 170 may comprise a locking door or any other suitable device that prevents one from removing and/or inserting indicia into the indicia holder 40, without the appropriate authorization.

The indicia 60 may comprise any suitable material that is permitted to be held in place by the indicia holder 40 or that is permitted to be placed in optical communication with the receiving surface 110 of the transitioning window 20. In one aspect, the indicia 60 may comprise an advertisement, signage, text/graphic content, as well as any other informational content. For example, the indicia 60 may be disposed upon a paper or cardboard section, or upon any other suitable material, which is dimensioned to be received and retained by the indicia holder 40. For example, when the system 10 is used in association with that of a soap dispenser, the indicia 60 may provide information that encourages the washing of the user's hands.

Figure 1A:
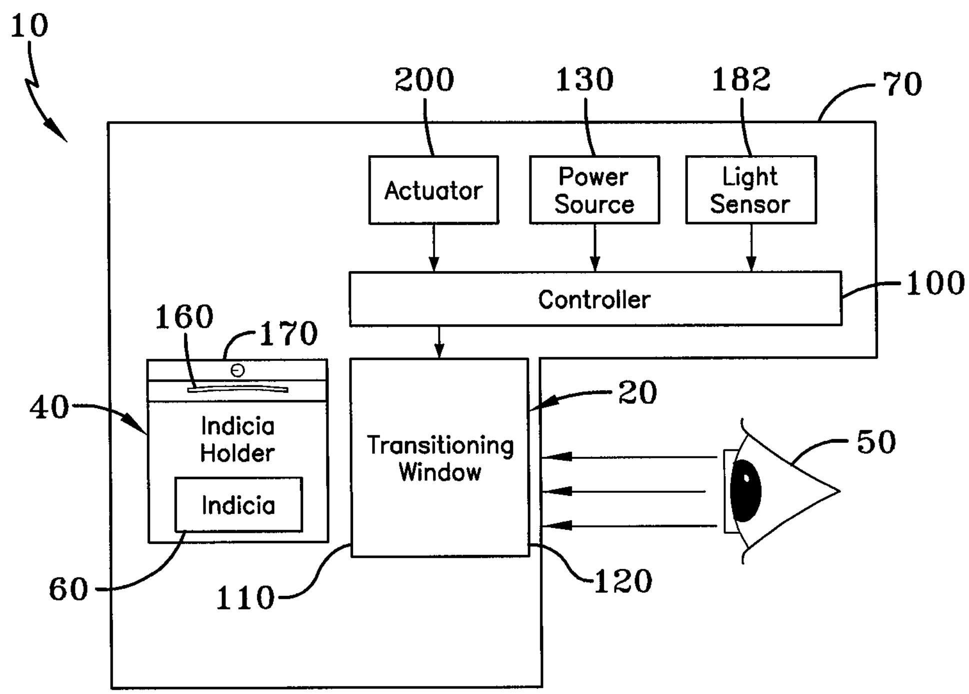
FIG. 1A is a block diagram of the system for selectively revealing indicia that does not utilize a light source in accordance with the concepts of the present invention.

It is also contemplated that in certain embodiments the indicia 60 may be illuminated by any suitable illumination source. For example, the indicia 60 may be illuminated by a light source 180 that is configured to operatively communicate light with the transitioning window 20. As such, light emitted from the light source 180 may be directed to one or more edges of the transitioning window 20 via a light pipe, optical fiber, or other suitable light routing means. By supplying the light to the edge of the window 20, the light will be carried through the transitioning window 20 so as to illuminate the indicia 60. Such operation serves to further draw the attention of the observer 50 to the indicia 60. It is also contemplated that the light source 180 may be activated based on the change in the ambient light surrounding the system 10 as detected by a light sensor 182 coupled to the controller 100. Alternatively, the system 10 may be configured without the light source 180, as shown in FIG. 1A, while still allowing the observer 50 to view the indicia 60 using the environmental ambient light surrounding the system 10.

The transition of the transitioning window 20 between opaque and transparent states is controlled by an actuator 200, which is coupled to the controller 100. The actuator 200 may comprise a button, a switch, or other device, such as a proximity sensor, that when actuated or otherwise in receipt of suitable stimuli, results in the controller 100 activating the transitioning window 20 so as to transition from a substantially opaque state to a substantially transparent state to permit the display of the indicia 60 to the observer 50. For example, in the case where the actuator 200 comprises a proximity sensor that is capable of detecting the presence or non-presence of one or more individuals, the controller 100 initiates the change in state at the window 20 from opaque to transparent when an individual is in the proximity of the actuator 200 and correspondingly initiates the change in state from transparent to opaque when the individual is no longer in the proximity of the actuator 200.

In another aspect, the system 10 may be configured such that, when the transitioning window 20 has transitioned to a transparent or substantially transparent state, a timer maintained by the controller 100 is initiated. After a predetermined amount of time, such as 5 seconds, has expired the controller 100 transitions the transitioning window 20 back to an opaque or substantially opaque state, thereby blocking or obscuring the indicia 60 from the view of the observer 50. In addition, it should be appreciated that other schemes or protocols for controlling the transition of the transitioning window 20 between opaque and transparent states may be utilized by the system 10, and thus those disclosed herein should not be construed as limiting.

For example, the system 10 or other system, such as a hands-free dispensing system controlling the operation of the system 10, may be configured whereby the transitioning window 20 is placed in a transparent or substantially transparent state to display the indicia 60 when a user initiates the washing of his or her hands upon the dispensing of soap. Once the soap is dispensed, the system 10 or other system associated therewith, identifies when a sufficient amount of time, such as the time period established by the Center for Disease Control (CDC), has expired that coincides with sufficient cleaning of one's hands. Once the time period has expired, the transitioning window 20 then transitions to an opaque state, so as to indicate that it is time to rinse the soap from the user's hands. In one aspect, the indicia 60 associated with such timed process may display informational content to alert the individual of the timed process being implemented.

Thus, with the general components of the system 10 set forth, the following discussion will be directed to specific embodiments that employ the operational features previously discussed.

Thus, an embodiment of the system 10, whereby the housing 70 comprises a dispenser 300, is shown in FIGS. 2 and 3A-C. The dispenser 300 is configured to dispense liquids, such as soap for example, such that upon the actuation of the actuator 200, a dispensing unit 310, such as a pump, is energized to dispense a quantity of material or dispensing item, such as soap, maintained by a refill unit or container 320 maintained in operative communication therewith. Coinciding with the actuation of the actuator 200, the transitioning window 20 transitions from a substantially opaque state, as shown in FIG. 3A to a transparent state, as shown in FIG. 3C, so as to display the indicia 60 for a predetermined period of time, or until the actuator 200 detects some other change in condition, such as the movement of the individual away from the proximity of the actuator 200. It should be appreciated that, as shown in FIG. 3B, the indicia holder 40 may comprise a ledge 330 upon which the indicia 60 is permitted to rest. Furthermore, while the dispenser 300 is presented as a liquid dispenser, it should be appreciated that it may be readily adapted to dispense any desired material.

In an alternative embodiment, the housing 70 maintaining the system 10 may comprise a towel dispenser 350, as shown in FIG. 4. The towel dispenser 350 maintains a dispensing slot 352 configured to provide a towel to the individual upon actuation of the actuator 200. Thus, the transitioning window 20 is configured to transition from a substantially opaque state to a substantially transparent state when the actuator 200 is activated. Furthermore, the towel dispenser 350 may have a door 360 that can be opened to access the indicia holder 40 and indicia 60 disposed therein, so that the indicia 60 can be updated or replaced as desired, or the indicia 60 may be accessed via the access port 160. Furthermore, the door 360 may be configured with the locking mechanism so that access to the indicia 40 is restricted. Or alternatively, the indicia 60 may be inserted or removed from the indicia holder 40 via the access port 160, as previously discussed.

Figure 5:
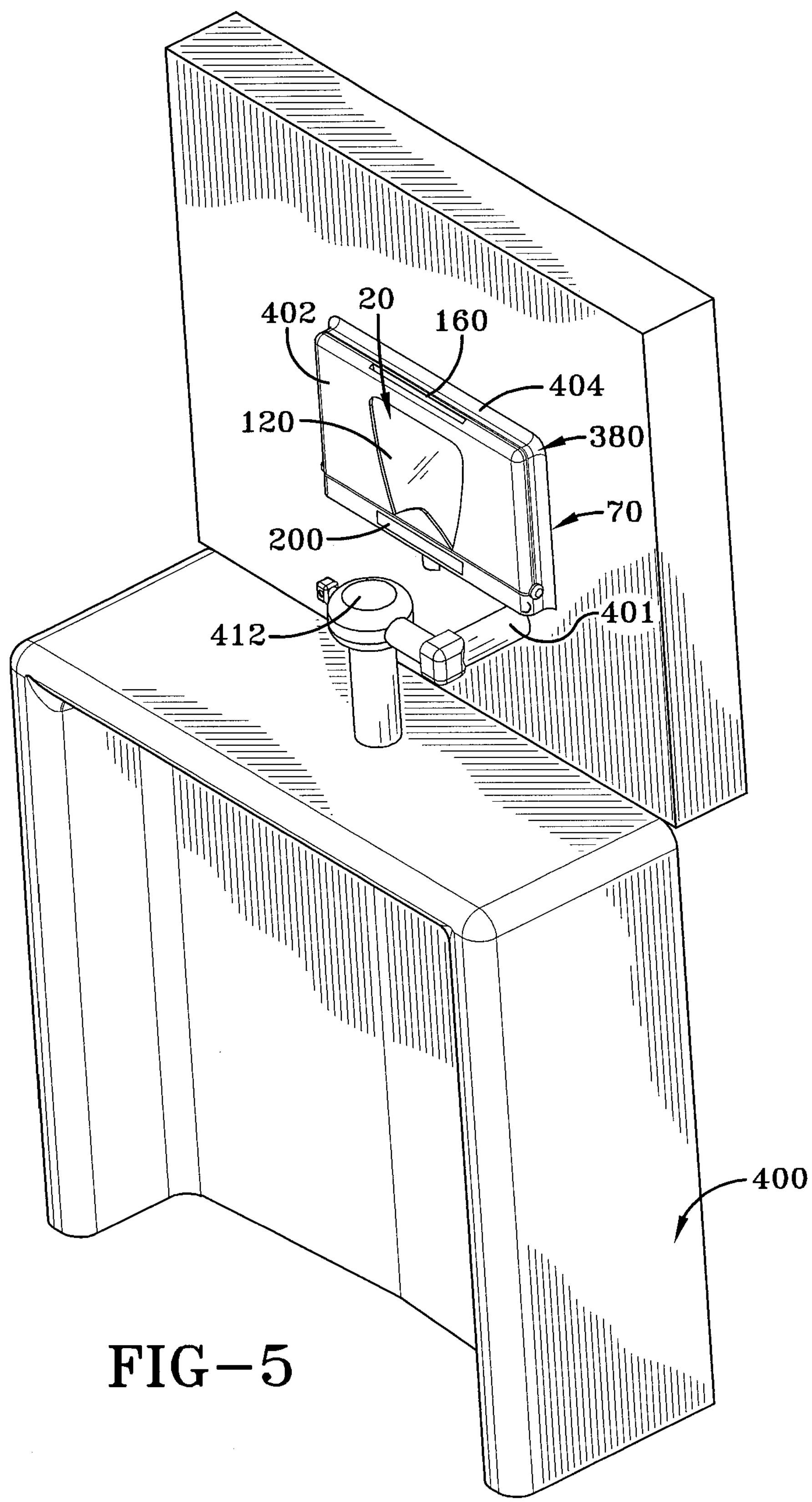
FIG. 5 is a perspective view of the system for selectively revealing indicia when utilized as a stand alone device in association with a urinal in accordance with the concepts of the present invention.

In yet another embodiment, the system 10 may be configured so that the housing 70 maintaining the actuator 200 is formed as a stand-alone unit 380, as shown in FIG. 5. In one aspect, the stand-alone unit 380 may be configured so that it may operatively interfaced with the power source used to activate an automatic toilet or urinal 400, or other device. For example, the system 10 may be configured such that a power line 401 is coupled between the power source supplied at a flush actuator 412 maintained by the automatic toilet or urinal 400 and the controller 100 maintained by the system 10. As such, the system 10 may be energized directly by the power used to power the automatic toilet or urinal 400, without the need of batteries or other portable power source 130. However, it should be appreciated that the stand-alone unit 380 may be powered by a portable power source, such as battery, or any other suitable power source, thus allowing the unit 380 to be placed in any desired position. Furthermore, the housing 70 of the standalone unit 380 comprises a pivoting door 402 that that is attached to a mounting section 404. The pivoting door 402 can be selectively opened to access the indicia holder 40, as well as the indicia 60 itself. Thus, in the event the indicia 60 is to be updated, the door 402 can be readily opened to enable the change of indicia 60. The mounting section 404 facilitates the mounting of the system 10 upon any desired surface or structure using suitable fasteners, such as screws or adhesive for example. In addition, the pivoting door 402 may provide the access port 160 thus facilitating the removal and insertion of new indicia within the housing 70.

Figure 6:
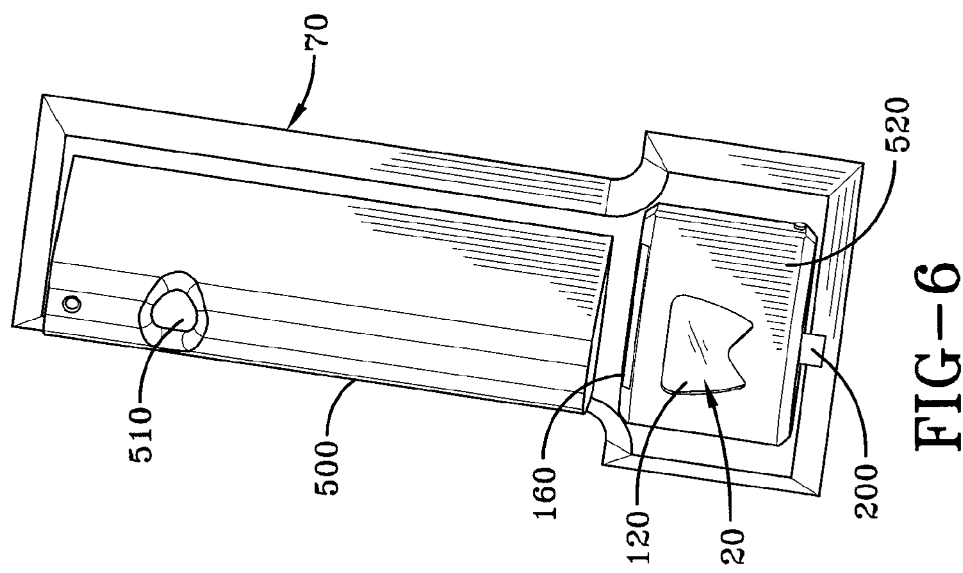
FIG. 6 is a perspective view of the system for selectively revealing indicia when utilized in association with a spray mister in accordance with the concepts of the present invention.

In another embodiment, as shown in FIG. 6, the system 10 may be configured whereby the housing 70 maintaining the system 10 comprises a spray mister 500. In one aspect, the spray mister 500 may be configured to dispense aerosolized material into the air to provide a pleasant scent via a dispensing port 510. As such, the transitioning window 20 may be configured to transition from a substantially opaque state to a substantially transparent state when an individual is within the proximity of the spray mister 500, as detected by the actuator 200. The spray mister 500 may also be configured such that the indicia 60 may be accessed through a pivoting door 520 or via the access port 160 disposed therein.

Figure 7:
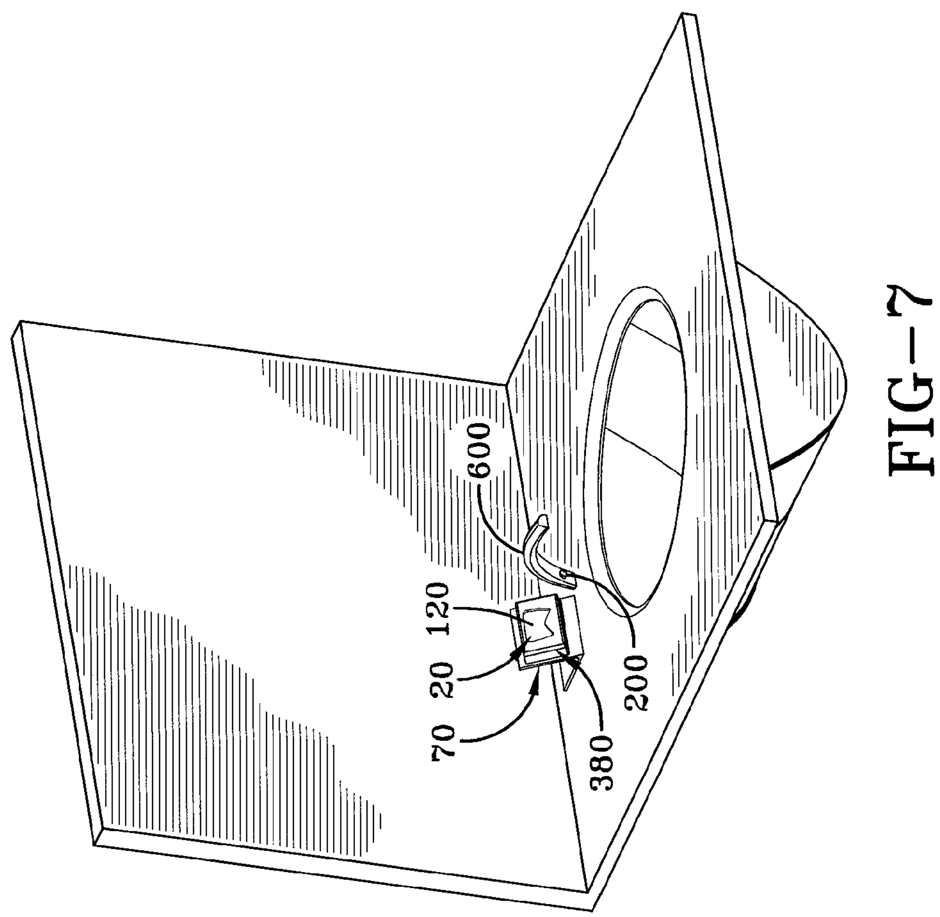
FIG. 7 is a perspective view of the system for selectively revealing indicia when configured as a stand alone device to provide a remotely located hands-free actuator, such as in a faucet, in accordance with the concepts of the present invention.

In addition, the system 10 may be configured whereby the actuator 200 is maintained separately from the housing 70 and is remotely wired to the controller 100 of the standalone unit 380. For example, the actuator 200 may comprise a proximity sensor that is remotely maintained in a fixture 600, such as a faucet, as shown in FIG. 7, although the proximity sensor 200 may be maintained in any suitable fixture, structure, or surface. Thus, when an individual comes within proximity of the fixture 600, the transitioning window 20 is transitioned to a substantially transparent state so as to display the indicia 60. Such a configuration allows the transitioning window 20 to be placed in one area, while the triggering action used to control the transitioning window 20 is sensed by the actuator 200 in another area. In another aspect, the system 10 can be configured to be retrofit with existing detection sensors, such as proximity sensors, that are maintained by an existing device. For example, in the case of hands-free devices, such as hands-free faucets, the proximity sensor 200 may already be incorporated therein. As such, a user desiring to initiate or trigger the operation of the transitioning window 20 from the detection of a person's hands may couple the controller 100 to the proximity sensor 200 maintained by the faucet or other fixture 600 using any suitable communication interface.

It will, therefore, be appreciated that one advantage of one or more embodiments of the present invention is that a system for selectively revealing indicia provides a transitioning window that transitions from a substantially opaque state to a substantially transparent state to display indicia therethrough. Still another advantage of the present invention is that a system for selectively revealing indicia provides an actuator that, when actuated, results in the transitioning window transitioning from a substantially opaque state to a substantially transparent state. An additional advantage of the present invention is that a system for selectively revealing indicia provides an indicia holder that removably retains indicia, so as to be shown to an observer through the transitioning window.

Although the present invention has been described in considerable detail with reference to certain embodiments, other embodiments are possible. Therefore, the spirit and scope of the appended claims should not be limited to the description of the embodiments contained herein.

What is claimed is:

1. A method for selectively revealing indicia to an observer comprising:
- providing a housing having a transitioning window, wherein said transitioning window has substantially opposed receiving and viewing surfaces, and wherein said window is configured to transition between an at least partially transparent state and an at least partially opaque state;
- sliding the indicia through an access slot disposed in said housing, said access slot in operative communication with an indicia holder having a ledge upon which the indicia is carried in said housing, such that the indicia is directly removable from said indicia holder through said access slot;
- supporting the indicia in said indicia holder in optical alignment with said receiving surface; and
- actuating said window to transition from said at least partially opaque state to said at least partially transparent state to allow the indicia to be viewable via said viewing surface through said receiving surface.

2. The method of claim 1, wherein said window returns to said at least partially opaque state after a predetermined amount of time.

3. The method of claim 1, further comprising:
- providing a proximity sensor to detect the presence of the observer;
- wherein said actuating step is performed upon the detection of the presence of the observer.

4. A dispenser comprising:
- a dispenser to dispense an amount of material when an actuator is engaged;
- a transitioning window carried by said dispenser having substantially opposed receiving and viewing surfaces, wherein said transitioning window is configured to transition between an at least partially transparent state and an at least partially opaque state;
- a controller coupled to said transitioning window;
- an actuator coupled to said controller;
- an access slot disposed in a wall of said dispenser, so as to receive indicia therethrough; and
- an indicia holder carried by said dispenser, said indicia holder in operative communication with said access slot, said indicia holder having a ledge that is configured to support the indicia slideably received through said access slot, such that the indicia is in optical alignment with said receiving surface and is directly removable from said indicia holder through said access slot;
- wherein upon the actuation of said actuator, said transitioning window transitions from said at least partially opaque state to said at least partially transparent state, so as to allow the indicia to be viewable via said viewing surface through said receiving surface.

5. The dispenser of claim 4, further comprising a light source coupled to said controller, said light source generating a light to illuminate the indicia.

6. A dispenser comprising:

a dispenser to dispense an amount of material when an actuator is engaged;

a transitioning window carried by said dispenser having substantially opposed receiving and viewing surfaces, wherein said transitioning window is configured to transition between an at least partially transparent state and an at least partially opaque state;

a controller coupled to said transitioning window;

an actuator coupled to said controller;

an indicia holder carried by said dispenser, said indicia holder configured having a ledge to support the indicia, so as to be in optical alignment with said receiving surface;

a light source coupled to said controller, said light source generating a light to illuminate the indicia; and a light sensor coupled to said controller to monitor the change in ambient light about said dispenser, wherein the intensity of said light emitted from said light source is adjusted based on the level of ambient light detected by said light sensor;

wherein upon the actuation of said actuator, said transitioning window transitions from said at least partially opaque state to said at least partially transparent state, so as to allow the indicia to be viewable via said viewing surface through said receiving surface.

7. The dispenser of claim 6, wherein said light sensor is in operative communication with an edge of said transitioning window.

8. The dispenser of claim 4, wherein said actuator comprises a sensor.

9. The dispenser of claim 1, further comprising:

removing the indicia from said indicia holder through said access slot.

10. The dispenser of claim 6, further comprising an access slot in operative communication with said indicia holder, said access slot configured such that the indicia is directly removable from said indicia holder through said access slot.

* * * * *